(12) United States Patent
Schmidt

(10) Patent No.: US 7,502,757 B2
(45) Date of Patent: Mar. 10, 2009

(54) SYSTEM AND METHOD FOR MATCHING BUYERS AND SELLERS IN A MARKETPLACE

(75) Inventor: Craig Schmidt, Sommerville, MA (US)

(73) Assignee: i2 Technologies US, Inc., Dallas, TX (US)

( * ) Notice: Subject to any disclaimer, the term of this patent is extended or adjusted under 35 U.S.C. 154(b) by 1464 days.

(21) Appl. No.: 09/820,370

(22) Filed: Mar. 11, 2001

(65) Prior Publication Data

US 2001/0047323 A1 Nov. 29, 2001

Related U.S. Application Data

(60) Provisional application No. 60/188,974, filed on Mar. 13, 2000.

(51) Int. Cl.
*G06Q 40/00* (2006.01)
(52) U.S. Cl. ........................................................ 705/37

(58) Field of Classification Search ............. 705/35–40, 705/26
See application file for complete search history.

(56) References Cited

U.S. PATENT DOCUMENTS 5,689,652 A * 11/1997 Lupien et al. .................. 705/37

* cited by examiner

*Primary Examiner*—Hani M Kazimi
*Assistant Examiner*—Olabode Akintola
(74) *Attorney, Agent, or Firm*—Steven J. Laureanti; Booth Udall, PLC

(57) ABSTRACT

In accordance with the present invention, a system and method for matching buyers and sellers in a marketplace accepts limit bids and offers into a central system. Periodically, an optimizing algorithm is executed to match buyers and sellers. The algorithm utilizes techniques to maximize global utility. After buyers and sellers are matched, a transaction price is calculated for each pairing. The transaction price is selected to ensure that each participant executes the transaction at that participant's best effective transaction price.

16 Claims, 7 Drawing Sheets

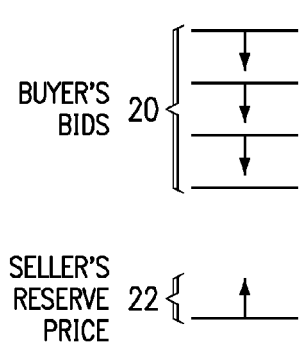
FIG. 1
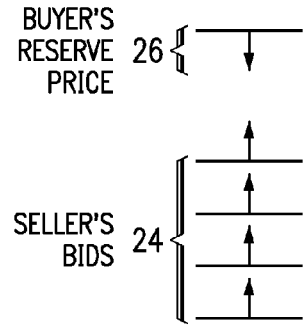
FIG. 2
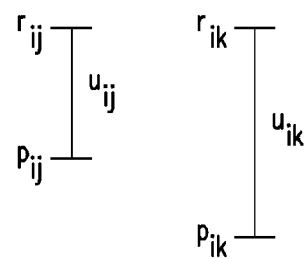
FIG. 3
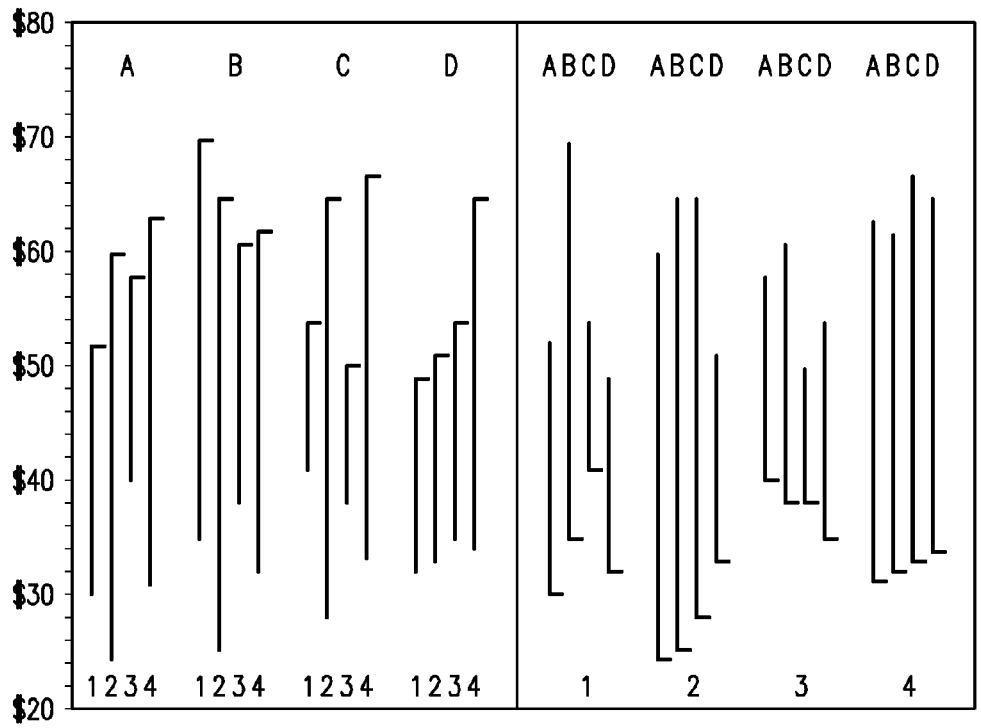
FIG. 4
|   | BUYERS | | | | LIMIT PRICES | | SELLERS | | | |
|---|---|---|---|---|---|---|---|---|---|---|
|   | 1 | 2 | 3 | 4 |   | A | B | C | D |   |
| A | $52 | $60 | $58 | $63 | 1 | $30 | $35 | $41 | $31 |
| B | $70 | $65 | $61 | $62 | 2 | $24 | $25 | $28 | $33 |
| C | $54 | $65 | $50 | $67 | 3 | $40 | $38 | $38 | $35 |
| D | $49 | $51 | $54 | $65 | 4 | $31 | $32 | $33 | $34 |
FIG. 5

\Problem name: maxmatch.LP
Maximize
 obj: 18 xD2 + 22 xA1 + 17 xD1 + 34 xC4 + 12 xC3 + 37 xC2 + 13 xC1 + 30 xB4
 + 23 xB3 + 40 xB2 + 35 xB1 + 32 xA4 + 31 xD4 + 18 xA3 + 19 xD3 + 36 xA2
Subject To
 b_A: xA1 + xA4 + xA3 + xA2 <= 1
 b_B: xB4 + xB3 + xB2 + xB1 <= 1
 b_C: xC4 + xC3 + xC2 + xC1 <= 1
 b_D: xD2 + xD1 + xD4 + xD3 <= 1
 s_1: xA1 + xD1 + xC1 + xB1 <= 1
 s_2: xD2 + xC2 + xB2 + xA2 <= 1
 s_3: xC3 + xB3 + xA3 + xD3 <= 1
 s_4: xC4 + xB4 + xA4 + xD4 <= 1
Bounds
 0 <= xD2 <= 1
 0 <= xA1 <= 1
 0 <= xD1 <= 1
 0 <= xC4 <= 1
 0 <= xC3 <= 1
 0 <= xC2 <= 1
 0 <= xC1 <= 1
 0 <= xB4 <= 1
 0 <= xB3 <= 1
 0 <= xB2 <= 1
 0 <= xB1 <= 1
 0 <= xA4 <= 1
 0 <= xD4 <= 1
 0 <= xA3 <= 1
 0 <= xD3 <= 1
 0 <= xA2 <= 1
End

*FIG. 6*

\Problem name: selleropt.LP
Maximize
 obj: u1 + u2 + u3 + u4
Subject To
 total: u1 + u2 + u3 + u4 + uA + uB + uC + uD + uE = 57
 A_1: u1 + uA >= 22
 A_2: u2 + uA >= 15
 B_2: u2 + uB >= 6
 B_3: u3 + uB >= 15
 B_4: u4 + uB >= 14
 C_4: u4 + uC >= 12
 D_3: u3 + uD >= 12
 E_3: u3 + uE >= 5
 E_4: u4 + uE >= 17
End

*FIG. 14*

\Problem name : buyeropt.LP

Maximize
 obj: uA + uB + uC + uD
Subject To
 total: u1 + u2 + u3 + u4 + uA + uB + uC + uD = 124
 A_1: u1 + uA >= 22
 A_2: u2 + uA >= 36
 A_3: u3 + uA >= 18
 A_4: u4 + uA >= 32
 B_1: u1 + uB >= 35
 B_2: u2 + uB >= 40
 B_3: u3 + uB >= 23
 B_4: u4 + uB >= 30
 C_1: u1 + uC >= 13
 C_2: u2 + uC >= 37
 C_3: u3 + uC >= 12
 C_4: u4 + uC >= 34
 D_1: u1 + uD >= 17
 D_2: u2 + uD >= 18
 D_3: u3 + uD >= 19
 D_4: u4 + uD >= 31
End

FIG. 7

\Problem name : selleropt.LP

Maximize
 obj: u1 + u2 + u3 + u4
Subject To
 total: u1 + u2 + u3 + u4 + uA + uB + uC + uD = 124
 A_1: u1 + uA >= 22
 A_2: u2 + uA >= 36
 A_3: u3 + uA >= 18
 A_4: u4 + uA >= 32
 B_1: u1 + uB >= 35
 B_2: u2 + uB >= 40
 B_3: u3 + uB >= 23
 B_4: u4 + uB >= 30
 C_1: u1 + uC >= 13
 C_2: u2 + uC >= 37
 C_3: u3 + uC >= 12
 C_4: u4 + uC >= 34
 D_1: u1 + uD >= 17
 D_2: u2 + uD >= 18
 D_3: u3 + uD >= 19
 D_4: u4 + uD >= 31
End

FIG. 8

```
\Problem name : maxmatch.LP
Maximize
 obj: 17 xE4 + 5 xE3 + 12 xD3
  + 12 xC4 + 14 xB4 + 15 xB3
  + 6 xB2 + 15 xA2 + 22 xA1
Subject To
 b_A : xA2 + xA1  <= 1
 b_B : xB4 + xB3 + xB2  <= 1
 b_C : xC4  <= 1
 b_D : xD3  <= 1
 b_E : xE4 + xE3  <= 1
 s_1 : xA1  <= 1
 s_2 : xB2 + xA2  <= 1
 s_3 : xE3 + xD3 + xB3  <= 1
 s_4 : xE4 + xC4 + xB4  <= 1
Bounds
 0 <= xE4 <= 1
 0 <= xE3 <= 1
 0 <= xD3 <= 1
 0 <= xC4 <= 1
 0 <= xB4 <= 1
 0 <= xB3 <= 1
 0 <= xB2 <= 1
 0 <= xA2 <= 1
 0 <= xA1 <= 1
End
```

*FIG. 12*

```
\Problem name : buyeropt.LP
Maximize
 obj: uA + uB + uC + uD +uE
Subject To
 total: u1 + u2 + u3 + u4 + uA + uB + uC + uD + uE = 57
 A_1 : u1 + uA >= 22
 A_2 : u2 + uA >= 15
 B_2 : u2 + uB >= 6
 B_3 : u3 + uB >= 15
 B_4 : u4 + uB >= 14
 C_4 : u4 + uC >= 12
 D_3 : u3 + uD >= 12
 E_3 : u3 + uE >= 5
 E_4 : u4 + uE >= 17
End
```

*FIG. 13*

SYSTEM AND METHOD FOR MATCHING BUYERS AND SELLERS IN A MARKETPLACE

CROSS REFERENCE TO RELATED APPLICATIONS

The present application claims the benefit of U.S. Provisional application No. 60/188,974, filed Mar. 13, 2000.

BACKGROUND OF THE INVENTION

1. Field of the Invention

The present invention relates generally to a computer assisted marketplace, and more specifically to a system and method for automatically matching buyers and sellers in a computerized marketplace, and determining the transaction prices.

2. Description of the Prior Art

As computer networks have entered most parts of the business world, they are used to assists in business transactions previously performed entirely manually, or with minimal automatic assistance. One area in which interconnected systems are becoming commonly used is in the automated purchasing of products, both by business at the wholesale level, and individual purchasers at the retail level. Various types of online marketplaces are growing to enable online purchases.

At present, most online marketplaces use some form of auction to set prices and determine a match. There are many forms of auctions, which are reviewed in P. Klemperer, "Auction Theory: A Guide to the Literature," *Journal of Economic Surveys,* 13 (3), 1999, 227-286. The form that will be most useful for the present purposes is a sealed bid auction. In this auction, there is one item for sale. Several buyers give sealed bids 20 to the auctioneer. As illustrated in FIG. 1, the seller also gives the auctioneer a reserve price 22, which is the worst price (or lowest price in this case) that he or she will accept for the item.

If any of the buyers' bids are higher than the reserve price 22, then the seller is matched with the highest bidding buyer. (Otherwise, no sale occurs.) In a first price auction, the buyer pays the price of their bid, and in a second price or Vickery auction the highest bidder pays the second highest price. As described in Klemperer, the expected revenue from first and second price auctions are the same, since rational buyers will adjust their bids accordingly to account for the "winner's curse."

There is also a sealed bid reverse auction, where a buyer accepts bids to buy something at the lowest price. This is often used in procurement. As illustrated in FIG. 2, sellers give bids 24 specifying their lowest price, and the buyer's reserve price 26 is the worst high price that he or she will accept.

A matching market can be viewed as a combination of several forward and reverse auctions happening simultaneously. The marketplace sorts out which matches actually occur, so that each item is only bought or sold one time, and sets the price for the transaction. A matching is a pairing of buyers with sellers so that each participant has at most one partner. Some participants may be left unmatched, which is inevitable if the number of buyers and sellers is unequal.

Automated marketplaces presently available do not adequately provide the best value for all participants. Also, they may not be stable, in the sense that a solution that is achieved is better for all participants than those participants could achieve on their own. These limitations have prevented matching marketplaces from becoming accepted as a mechanism to match buyers and sellers of products automatically.

It would be desirable to provide a system and method that could automatically match buyers and sellers in a marketplace. It would be further desirable for such a system and method to provide optimum results and ensure a stable result.

SUMMARY OF THE INVENTION

In accordance with the present invention, a system and method for matching buyers and sellers in a marketplace accepts limit bids and offers into a central system. Periodically, an optimizing algorithm is executed to match buyers and sellers. The algorithm utilizes techniques to maximize global utility. After buyers and sellers are matched, a transaction price is calculated for each pairing. The transaction price is selected to ensure that each participant executes the transaction at that participant's best effective transaction price.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 1 and 2 illustrate auctions and reverse auctions;

FIG. 3 illustrates linear utility in accordance with the present invention;

FIG. 4 is a first example showing operation of the present invention in a marketplace having four sellers and four buyers;

FIG. 5 is a table showing limit prices for the example of FIG. 4;

FIGS. 6, 7, and 8 are input files for a linear programming solver used in the example of FIG. 4;

FIGS. 12, 13, and 14 are input files for a linear programming solver used in the example of FIG. 11;

DESCRIPTION OF THE PREFERRED EMBODIMENT

The following discussion explains the general approach to be taken to implement the preferred matching marketplace, followed by the mathematical basis for the preferred matching algorithm.

The following description will use linear utility as a way of measuring a participant's preference for one match over another at given prices. This assumption is quite prevalent in the matching literature. Nevertheless, if desired convex nonlinear utility preferences could be used, which would change most of the following to a convex program, rather than a linear program. Consider that buyer i is trying to decide between the two items from j and k. From the definition of the reserve price, we know that i is indifferent between being matched to j or k at their respective reserve prices. What if buyer i could be matched with j at price $p_{ij}$, or with k at price $p_{ik}$? The linear utility u of a match is the absolute value of the difference between the price and the reserve price. According to FIG. 3, the linear utility would be greater for a match with k, so buyer i will prefer that match. Note that this is in spite of the fact that seller j has a higher reserve price. Of course symmetric definitions exist for a seller considering two offers from buyers.

For example, if buyer i sets a limit price of $40 for a purchase from seller j, and seller j sets a limit price of $25 for a sale to buyer i, the linear utility of a match between i and j is simply $15.

A concept important to the preferred embodiment is that of stability. Stability in a set of participants means that no participant can obtain an improved deal by pairing with a different buyer or seller. A solution that is stable ensures that each participant has done as well as they could without participating in the matching marketplace.

Consider a matching where buyer i has utility $u_i$, seller j has utility $u_j$, and i and j are not matched to each other. If $r_{ij} - r_{ji} > u_i + u_j$ then i and j would increase their total utility by pairing with each other rather than their current matches, and we say i and j form a blocking pair. It will always be possible to find a price p (where $r_{ij} - u_i > p > r_{ji} + u_j$) that will allow both i and j to increase their utility by changing partners and matching with each other. A stable matching is one without a blocking pair. It has been observed that marketplaces producing matches that are unstable break down over time. One well known example is the program that matches medical residents to hospital internships. Fortunately, both the assignment game and marketplace described herein will produce matches that are stable.

Figure 16:
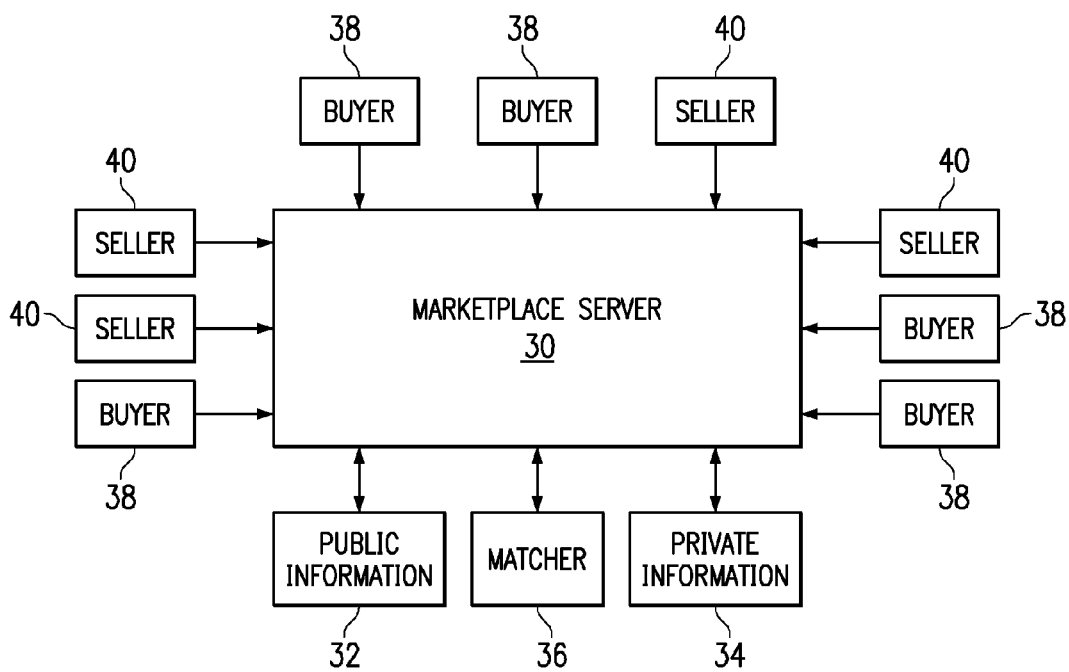
FIG. 16 is a block diagram of a system used to implement the preferred embodiment.

The following discussion presumes that an automated marketplace has been implemented, as illustrated in FIG. 16. The automated marketplace is implemented through a marketplace server 30, which serves as a central data repository and is responsible for running the market. This could be a single, centralized machine, or can be distributed in various ways as known in the art. The server 30 retains data reflecting public information 32 and private information 34. Also, a matcher process, to be described in detail below, is part of the server 30 and operates the actual matching process.

Numerous buyers 38 and sellers 40 are connected to the server 30. buyers 38 and sellers 40 communicate information to the server 30 to enable the market to be operated. Some of this information is made publicly available to participants in the market, while other information is kept private.

Sellers provide products or services for sale, and list a limit price for such products and services. The limit is the lowest price at which the seller will sell that product. Each buyer lists products that they will purchase, and lists a limit price that is the maximum they will pay. The limit prices are retained as private information, not available to anyone other than the participant that entered them. Availability of products, and the fact that they are being bid on, are public information.

In its simplest form, the market deals in a single type of product, or at least products that are deemed interchangeable, and all buyers are willing to buy products from any seller. In a more complex form, buyers can select a subset of sellers from whom they are willing to buy the product, and sellers can select a subset of buyers to whom they are willing to sell. Each buyer and seller can, if desired, set a different limit price for each seller or buyer with whom they are willing to pair.

A particular buyer can only be paired with a particular seller if both are willing to be paired with each other. If only one is willing, that particular pairing is ruled out. If desired, a buyer or seller can indicate a willingness to be paired with anyone, which becomes the all-to-all case when selected by all buyers and sellers.

The ability to select other participants with whom a participant is willing to be paired is preferably combined with an ability to set a different limit price for each potential pairing. This lets each buyer and seller determine any non-purchase-price factors they wish to consider, and incorporate them into the limit price for that potential pairing. For example, if a particular seller is preferred by a buyer, that buyer might set a higher limit price for that seller than any other. Because of the higher limit price, the buyer is more likely to be paired with that seller. Lower limits can be set for other sellers, and if a buyer gets paired with a non-preferred seller, the purchase price will be lower to compensate.

As will be understood from the following description, this selective ability allows the marketplace to handle numerous different products simultaneously. If three different products are offered for sale, the interested buyer selects those she wishes to purchase by simply identifying the sellers of those products, only, as those with whom she is willing to pair. Also, the matcher can be run on only certain products at one time, simplifying the overall matching problem.

Each buyer and seller is considered to be bidding or offering on only a single product. If a buyer wants more than one product, each purchase is considered to be a separate bid, by a separate "buyer." In a similar manner, each item offered by a seller is considered to be separate. Multiple products can be considered as an extension of this model, as described below.

The matching process is performed in a batch mode. Numerous bids and offers are entered into the system through the server 30. On a periodic basis, such as hourly, daily, weekly, or whatever period is appropriate, matcher 36 is invoked on the pending bids and offers to match participants, and to determine the purchase price. The process by which this is performed is described in detail below, but is generally a two step process. First, buyers and sellers are paired so as to maximize the overall utility obtained by the system. This maximization is a typical linear programming process given the constraints of the system. In the second step, the transaction price for each pair is calculated. This calculation is performed so that the solution is stable; that is, so that each participant can do no better by changing the pairing to some other than the one selected by the automated process.

The process of the invention is similar to a technique known as the assignment game. A description of this approach can be found in L. S. Shapley and M. Shubik, "The Assignment Game I: The Core," *International Journal of Game Theory*, 1, 1972, 111-130. Much of the notation used herein comes from A. E. Roth and M. A. O. Sotomayor, *Two-Sided Matching: A Study in Game-Theoretic Modeling and Analysis*, Cambridge University Press, 1990, 2-10. However, the model used by the present invention is different than the assignment game, and the techniques for solving the model are also different.

The mathematical description of the relevant constructs is as follows:

Index Sets $i \in P$ set of buyers $|P|=m$ $j \in Q$ set of sellers $|Q|=n$

Variables $u \in \Re^m$ utility of buyers $v \in \Re^n$ utility of sellers $x_{ij} \in \{0,1\}^{m \times n}$ 1 if buyer i is assigned to seller j, and 0 otherwise Parameters $r_{ij}$ $\forall i \in P, j \in Q$ reserve price of buyer i with respect to seller $r_{ji}$ $\forall i \in P, j \in Q$ reserve price of seller j with respect to buyer i $$\alpha_{ij} = \begin{cases} r_{ji} - r_{ij} & r_{ji} > r_{ij} \\ 0 & r_{ji} \leq r_{ij} \end{cases} \forall i \in P, j \in Q$$

utility of matching buyer i with seller j

Primal Problem P1:

| | |
|---|---|
| $\max \sum_{i \in P} \sum_{j \in Q} \alpha_{ij} x_{ij}$ | objective to maximize linear utility |
| $\sum_{i \in P} x_{ij} \leq 1 \quad \forall j \in Q$ | no seller j can be matched with more than one buyer i |
| $\sum_{j \in Q} x_{ij} \leq 1 \quad \forall i \in P$ | no buyer i can be matched with more than one seller j |
| $x_{ij} \geq 0 \; \forall i \in P, j \in Q$ | assignment variables must be nonnegative |

The $x_{ij}$ variables represent the assignment of buyer i to seller j by taking a value of 1, or no assignment by taking a value of 0. Problem P1 is an integer programming problem because of the restrictions that the $x_{ij}$ variables take values of 0 or 1. This problem is also called the assignment problem. It is well known that the assignment polytope is totally unimodular, meaning that all optimal solutions for P1 will naturally take values of 0 or 1 for each variable. Problem P1 can be solved efficiently by the network simplex method, or a specialized procedure like the Hungarian algorithm.

Dual Problem D1:

$$\min \sum_{i \in P} u_i + \sum_{j \in Q} v_j$$
$$u_i \geq 0 \quad \forall i \in P$$
$$v_j \geq 0 \quad \forall j \in Q$$
$$u_i + v_j \geq \alpha_{ij} \quad \forall i \in P, j \in Q$$

This problem is the dual of P1. The constraints of problem D1 ensure that the utility of a final matching is stable. Informally, it says that any buyer-seller pair must get as much total utility as they could by being matched with each other. It is interesting to note that problem D1 is also the linear programming dual of P1. By strong duality, the optimal objective value of the primal problem must equal the optimal objective value of the dual problem. Thus we have:

$$\sum_{i \in P} u_i + \sum_{j \in Q} v_j = \sum_{i \in P} \sum_{j \in Q} \alpha_{ij} x_{ij}$$

It is possible to solve the assignment game by using a commercial Linear Programming solver on problem D1. The utility of each participant is given by the u and v variables. It is possible to tell which buyers and sellers are matched by examining the binding constraints. If there is a constraint where $u_i + v_j = \alpha_{ij}$, then buyer i is paired with seller j in the matching.

The constraints of problem D1 ensure that the solution is stable. However, stability is not enough to guarantee a unique solution. In fact, as we will see in the following section, there are an infinite number of possible solutions. There is a single stable solution that maximizes the benefits for each individual buyer (termed the P-optimal solution), and a single stable solution that maximizes the benefits for each individual seller (the Q-optimal solution). Roth and Sotomayor provide an algorithm that is a generalization of a Vickery auction that can be used to find a P-optimal or Q-optimal matching.

Once there is a feasible payoff (u,v) for a feasible assignment x, the prices paid by each match can be determined as:

$p_i = r_{il} - u_i \; \forall i \in P, l | x_{il} = 1$ $p_j = r_{jk} + u_j \; \forall j \in Q, k | x_{kj} = 1$ In the following discussion, the focus will be on determining the utility (u,v) for the participants. It is important to remember that each buyer will pay a price of their reserve price minus this utility, and each seller will pay a price of their reserve price plus the utility.

The auction procedure of Roth and Sotomayor for finding P-optimal and Q-optimal solutions is quite specific. In addition to a few simplifications (such as the reserve prices for the seller being the same for all buyers), the algorithmic nature of the procedure makes it more difficult to work with than a purely linear programming approach. The preferred embodiment uses a new way to find the P-optimal and Q-optimal solutions to the assignment game, as well as variations in between. Later in the discussion, it will be seen that it easily generalizes to incorporate many economically useful features.

The preferred calculations are as follows:

1. Solve model P2, and let the optimal objective value be z*. The buyers and sellers are paired using the $x_{ij}$ variables of P2.

2. Solve the augmented dual problem D2 two times, with the different objectives given below. Find the P-optimal allocation, and then the Q-optimal allocation. As described below, any desired λ solutions can be computed by combining these two points.

3. Determine the prices paid by each match as previously described, given the utility vector determined in step 2.

Index Sets $i \in P$ set of buyers $|P| = m$ $j \in Q$ set of sellers $|Q| = n$ $i \in P_j \subseteq P$ set of buyers that seller is interested in matching $j \in Q_i \subseteq Q$ set of sellers that buyer i is interested in matching $(i,j) \in M = P \times Q | i \in P_j, j \in Q_i$ set of mutually interested pairs of participants Variables $u \in \Re^n$ utility of buyers $v \in \Re^n$ utility of sellers $x_{ij} \in \{0,1\}^{m \times n}$ assignment of buyer i to seller j Parameters $r_{ij}$ $\forall i \in P, j \in Q$ reserve price of buyer i with respect to seller j $r_{ji}$ $\forall i \in P, j \in Q$ reserve price of seller j with respect to buyer i $$\alpha_{ij} = \begin{cases} r_{ji} - r_{ij} & r_{ji} > r_{ij} \\ 0 & r_{ji} \leq r_{ij} \end{cases} \forall i \in P, j \in Q$$

utility of matching buyer i with seller j

Primal Problem P2:

$$\max \sum_{(i,j) \in M} \alpha_{ij} x_{ij}$$

$$\sum_{i \in P_j} x_{ij} \leq 1 \quad \forall j \in Q$$

$$\sum_{i \in Q_j} x_{ij} \leq 1 \quad \forall j \in P$$

$x_{ij} \geq 0$ $\forall (i,j) \in M$

Dual Problem D2:

$u_i \geq 0$ $\forall i \in P$ $v_j \geq 0$ $\forall j \in Q$ $u_i + v_j \geq \alpha_{ij}$ $(i,j) \in M$ $$\sum_{i \in P} u_i + \sum_{j \in Q} v_j = z^*$$

This is an improvement over model D1, because it will give maximum, stable utilities for any arbitrary objective. This flexibility will be used to change the objective in finding our P-optimal and Q-optimal solutions.

P-Optimal Solution:

$$\max \sum_{i \in P} u_i$$

subject to D2

Note that this model has the remarkable property that it maximizes the individual utility of each buyer. That is, if $\bar{u}_k$ is the optimal for arbitrary buyer k in the P-optimal solution, then $\bar{u}_k$ will be same as the optimal objective of:

max $u_k$ subject to D2.

We will refer to the P-optimal solution by the vector $(\bar{u}, \underline{v}) \in \mathfrak{R}^{m+n}$.

Q-Optimal Solution:

$$\max \sum_{j \in Q} v_j$$

subject to D2

This model has the same property that it maximizes the individual utility of each seller.

We will refer to the Q-optimal solution by the vector $(\underline{u}, \bar{v}) \in \mathfrak{R}^{m+n}$.

There is a continuum of solutions between the P-optimal and Q-optimal. Any convex combination of the points $(\bar{u}, \underline{v})$ and $(\underline{u}, \bar{v})$ will also satisfy D2 and therefore be stable. (This is a well-known result for convex polytopes.) We will define the $\lambda$-solution to be $\lambda(\bar{u}, \underline{v}) + (1-\lambda)(\underline{u}, \bar{v})$, where $\lambda \in [0,1]$. The 0-solution is the same as the Q-optimal solution, the 1-solution is the same as the P-optimal solution, and the 0.5-solution is "fair" since it is the midpoint between the two extremes. Many marketplaces will operate at some fixed value of $\lambda$.

EXAMPLE 1

All Possible Matches Allowed

The example now described is a numerical example using the simple matching method. There are four buyers called A, B, C, and D. There are four sellers called 1, 2, 3, and 4. All possible matches between the buyers and sellers are permitted. The reserve prices of each participant can be seen in FIG. 4.

On this and subsequent graphs there are two copies of the data. The left hand graph gives the view from the buyers' perspective. For example, the four leftmost lines show the reserve prices of buyer A with respect to sellers 1-4. Buyer A has a reserve price of $52 to be matched with seller 1, who has a reserve price of $30. The right hand part of the graph shows the same data sorted from the sellers' perspective. The height of the lines between the reserve prices gives the linear utility of a particular match.

FIG. 5 shows, in table form, the same information. On the left side, each row indicates the reserve prices that the buyer is willing to pay with respect to each seller. For example, buyer A is willing to pay $60 to buy from seller 2, and $58 to buy from seller 3. The right side of the table indicates the reserve prices for the sellers. For example, seller 4 is willing to sell to buyer A for $31, and buyer C for $33.

The formulation of problem P2 for this problem is given in FIG. 6. This format is the "LP" file format used by the CPLEX solver, which is a fairly natural representation. One linear programming solver that can be used, and has been used for these examples, is ILOG CPLEX 6.5, as described in the *Reference Manual*. The formulation of D2 with the P-optimal objective is given in FIG. 7, and with the Q-optimal objective is in FIG. 8.

In both cases, it is seen that the utility expressions are the same. For example, in FIG. 7, the total utilities of buyer A and seller 1 must be greater than or equal to 22, which is the difference between their reserve prices. This same constraint is seen in FIG. 8. The only difference between these two programs is the objective equation to be maximized. The results are, respectively, the optimal solution for the buyers, and the optimal solution for the sellers.

Table I gives the optimal matches from problem P2:

TABLE I

| Buyer | Seller |
|-------|--------|
| A | 2 |
| B | 1 |
| C | 4 |
| D | 3 |

Table II gives the optimal utility for the P-optimal, Q-optimal, and midpoint solutions of D2:

TABLE II

| Participant | Buyer optimal utility | Seller optimal utility | "Midpoint" utility |
|---|---|---|---|
| Buyer A | 21 | 0 | 10.5 |
| Buyer B | 34 | 4 | 19 |
| Buyer C | 22 | 1 | 11.5 |
| Buyer D | 19 | 0 | 9.5 |
| Seller 1 | 1 | 31 | 16 |
| Seller 2 | 15 | 36 | 25.5 |
| Seller 3 | 0 | 19 | 9.5 |
| Seller 4 | 12 | 33 | 22.5 |

Figure 9:
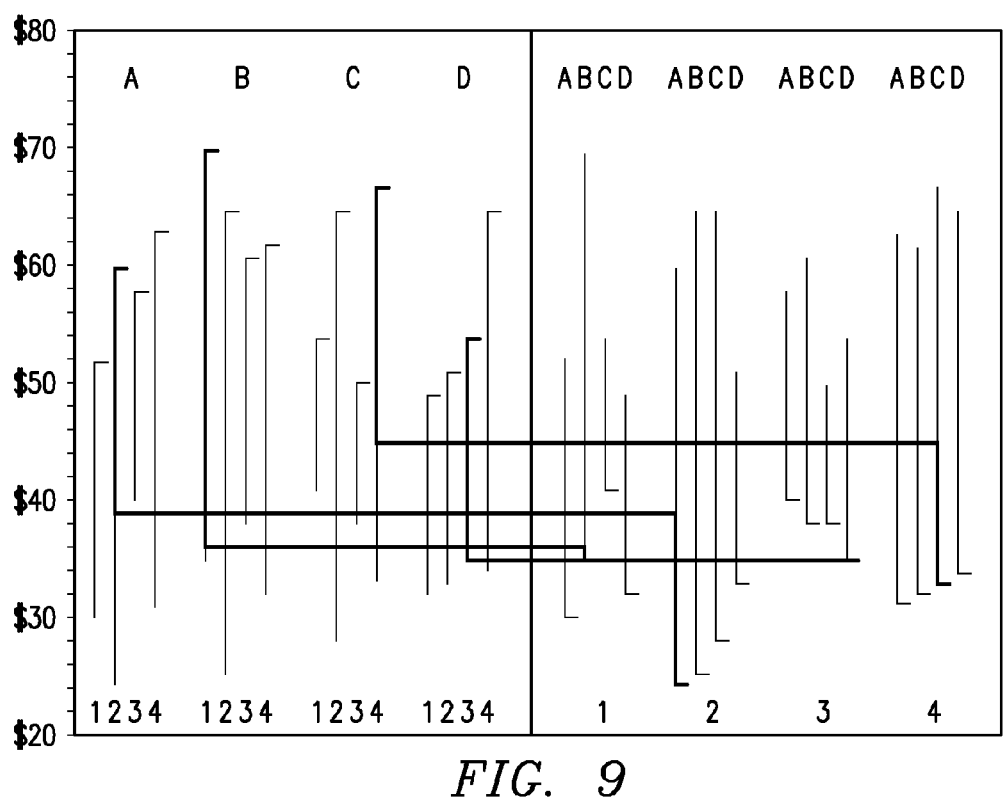
FIGS. 9 and 10 are graphs illustrating solutions of the example of FIG. 4 in accordance with the present invention.
Figure 10:
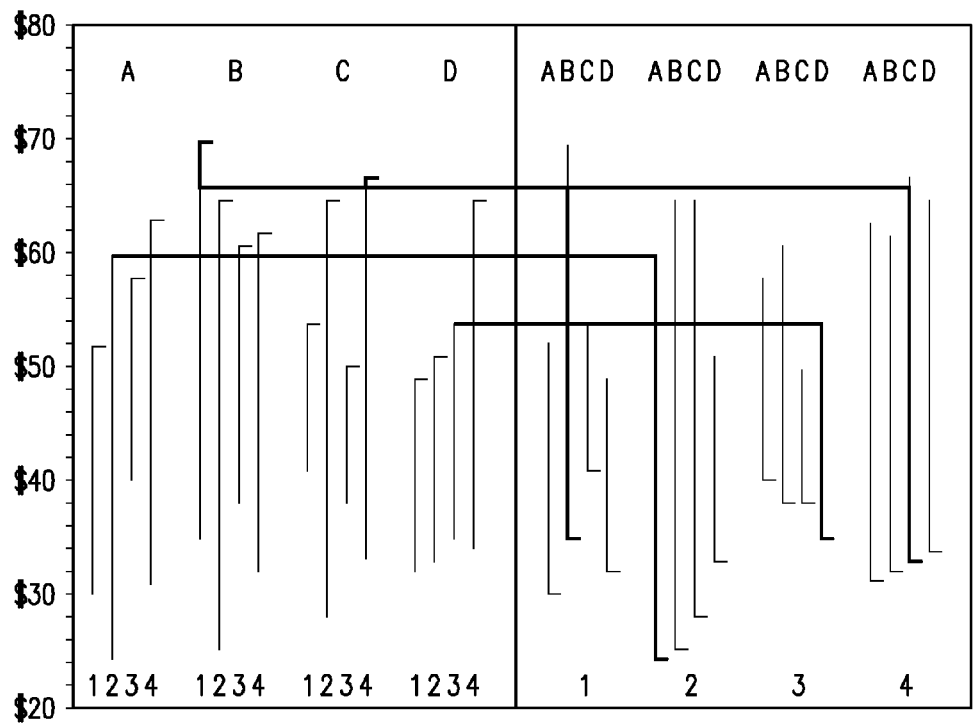

The objective for P2 was 124, the P-optimal objective was 96, and the Q-optimal objective was 119. FIG. 9 gives a graphical form of the P-optimal solution. The heavy lines are the optimal matches. The heavy horizontal lines show the optimal prices of the buyers and sellers. Note that in order to be stable, a buyer and seller will share all of the utility produced between them, so the buyer and seller prices are identical. FIG. 10 shows the corresponding Q-optimal solution.

If a midpoint is to be selected between the P-optimal and Q-optimal solutions, λ is selected to be 0.5. As shown in Table II, this gives the midpoint between the two optimal solutions previously calculated. By varying λ, the marketplace can be slanted more in favor of buyers or sellers, with 0.5 being considered as "fair."

EXAMPLE 2

Only Certain Matches Allowed

Figure 11:
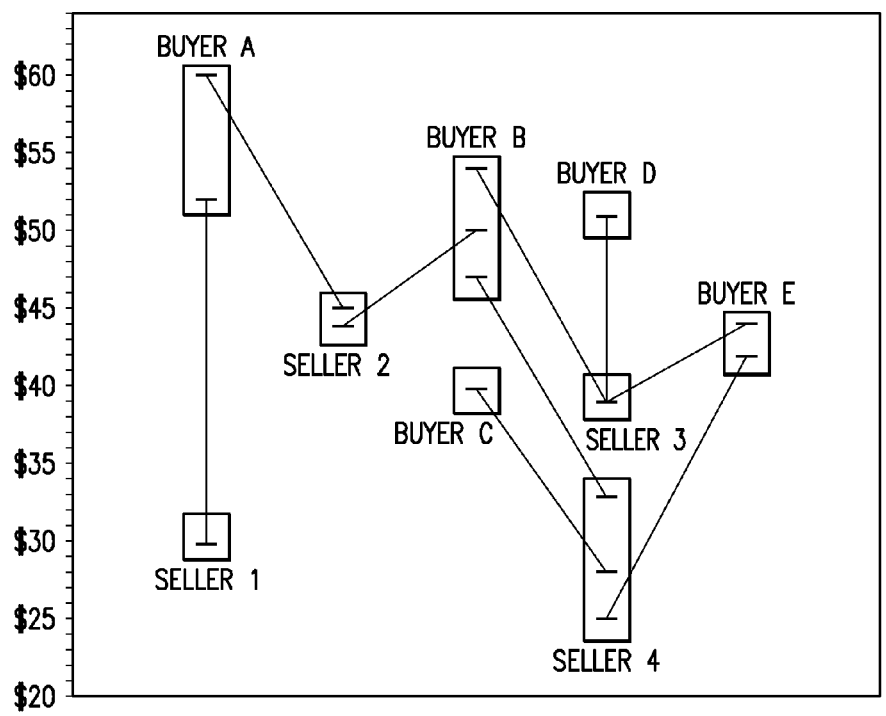
FIG. 11 is a graph showing buyer and seller relationships and limits in accordance with a second example.

The previous example could have been solved by either our simple approach or the assignment game. This example extends the problem to only allow certain potential matches. There are five buyers called A through E, and four sellers, called 1 through 4. FIG. 11 shows the nine mutually interested pairs of participants by lines connecting the rectangular boxes. The y axis of the figure shows the reserve prices. For example, Seller 2 is only interested in matching with Buyer A at a reserve price of $45 or Buyer B at a reserve price of $44. FIG. 12 gives the listing for problem P2, FIG. 13 gives the listing for the P-optimal D2, and FIG. 14 gives the listing for the Q-optimal D2. The optimal solution is summarized in FIG. 15. The matches are shown by the bold lines, and the optimal prices are also shown on the chart. Note that Buyer C was left unmatched. For exactness, the optimal utilities are also given in Table III:

TABLE III

| Participant | Buyer Optimal Utility | Seller Optimal Utility | "Midpoint" Utility |
|---|---|---|---|
| Buyer A | 22 | 12 | 17 |
| Buyer B | 6 | 3 | 4.5 |
| Buyer C | 0 | 0 | 0 |
| Buyer D | 3 | 0 | 1.5 |
| Buyer E | 5 | 0 | 2.5 |
| Seller 1 | 0 | 10 | 5 |
| Seller 2 | 0 | 3 | 1.5 |
| Seller 3 | 9 | 12 | 10.5 |
| Seller 4 | 12 | 17 | 14.5 |

Figure 15:
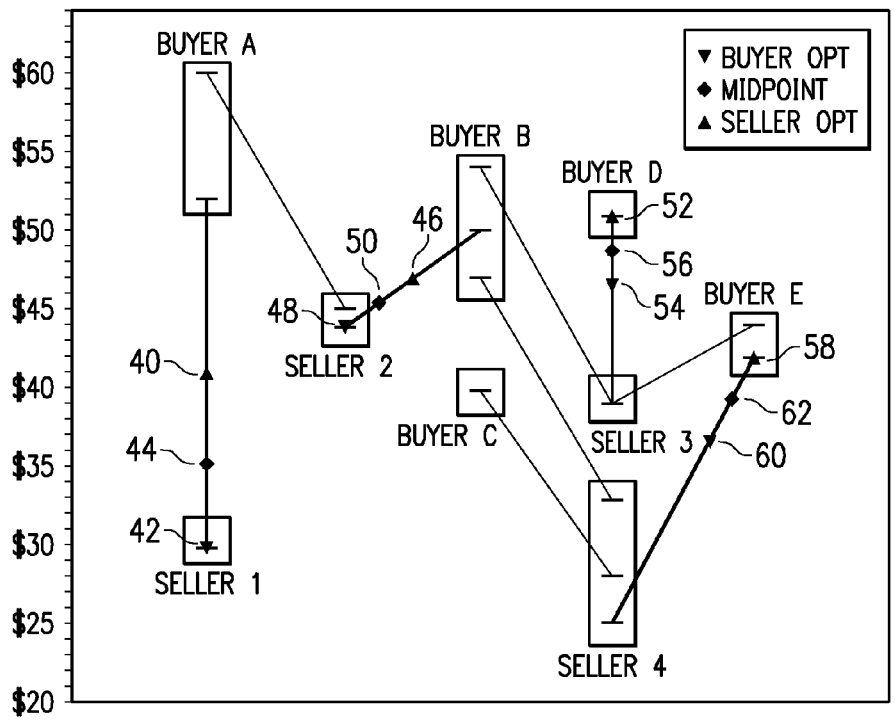
FIG. 15 is a graph showing optimal participant matching and transaction prices for the example of FIG. 11.

The utilities shown in Table III are the differences calculated from the respective buyers' and sellers' reserve prices. For example, Buyer A has a buyer optimal utility of 22, meaning that the calculated price for Buyer A's buyer optimal utility is $52 (the reserve price)−$22 (the utility)=$30. As shown in FIG. 15, the midpoint utility for Buyer A is $52−$17=$35. The remaining plotted points in the figure are obtained in the same manner.

Buyer A's seller optimal, buyer optimal, and midpoint utilities, when added to the reserve prices, are marked as points 40, 42, and 44, respectively. Buyer B's seller optimal, buyer optimal, and midpoint utilities are marked as points 46, 48, and 50, respectively. Buyer D's seller optimal, buyer optimal, and midpoint utilities are marked as points 52, 54, and 56, respectively. Buyer E's seller optimal, buyer optimal, and midpoint utilities are marked as points 58, 60, and 62, respectively. Buyer C did not make a purchase under this example.

Referring to FIG. 15, it can be seen that the solution generated as described provides a best case result for each involved participant. Also, the results are consistent with what would be expected given the restraints imposed by the various buyers and sellers selections of possible matching pairs. Seller 1, who will only sell to Buyer A, does not do as well as he would if he would sell to more than one buyer. Because Buyer A can buy from Seller 2 also, Seller 1's seller optimal utility 40 is limited to a relatively low value ($40). The buyer optimal utility 42 for Seller 1 is equal to Seller 1's reserve price, because of the lack of purchaser competition for Seller 1's product.

In a similar manner, Sellers 3 and 4 do relatively well, because each has a captive buyer (Buyer D and Buyer C, respectively) who will only buy from a single seller. This means that Seller 3 and Seller 4 can always sell to the captive buyer, so the optimal utility for these sellers is relatively high. In other words, a stable solution requires that Seller 3 and Seller 4 do no worse than they would if they sold to their respective captive buyers. This can be seen in the figure, with Seller 3 having a seller optimal utility 52 equal to Buyer D's reserve price, and a buyer optimal utility 54 higher than Seller 3's reserve price. In a similar manner, Seller 4 has a seller optimal utility 58 equal to Buyer E's reserve price, and a buyer optimal utility 60 higher than Seller 4's reserve price.

Because Seller 2 has a relatively high reserve, Buyer A is paired with captive Seller 1. this leaves Seller 2 in the same position as a seller who is captive to a single buyer. Thus Seller 2 has a seller optimal utility 46 that is lower than Buyer B's reserve price, and a buyer optimal utility 48 that is equal to Seller 2's reserve price.

The figure also illustrates that the resulting solution is stable. As previously described, stability occurs when each participant could do no better by being paired with a different participant. For example, the midpoint utility 44 for Buyer A is $35, corresponding to the midpoint utility of 17 in Table III. The maximum possible utility Buyer A could have obtained from Seller 2, its only other possible match, is 15 ($60−$45). Thus, Buyer A cannot pair with another seller to obtain a better result than that obtained in the result shown. Seller 1, because it is unwilling to pair with anyone else, can do no better than the utility of as shown.

The situation of Seller 4 is also illustrative. Seller 4 is guaranteed a minimum utility of 12, because captive buyer C is willing to buy at $40, and Seller 4 is willing to sell to Buyer C at $28. Seller 4's midpoint utility is 14.5, as shown in Table III, so Seller 4 prefers to sell to Buyer E, and Buyer C does not make a purchase. Because of the constraints included in dual D2, each pairing is optimal for each participant and the resulting solution is stable.

When many sellers are willing to sell to any buyer, and many buyers are willing to buy from any seller, the sparse solution will, in practice, approach the same result obtained in the first example, in which buyers and sellers did not limit their prospective pairings. When buyers and sellers wish to limit the possible pairings, the described algorithm produces both a pairing and a resulting transaction price that optimal and stable.

As previously described, the optimal matchings and pairings are performed using any widely available linear programming solver applied to the constraints set forth herein. Use of these constraints allows buyers and sellers to select the possible pairings they will allow. This can be used to differentiate between different products available in a single marketplace. Also, it allows both buyers and sellers to include non-price related factors in the market by adjusting their reserve prices for preferred pairings.

Once the P-optimal and Q-optimal solutions are calculated, the remaining utility between these two values can be split up as desired between the buyer and seller of each transaction. Splitting the difference evenly can be considered "fair", but a preference for either side is implemented by simply selecting a ration other than 0.5 to share this utility. Also, if the marketplace is run by an entity that needs to make a profit, a small amount of the utility shared by the buyer and seller can be taken to pay the marketplace manager. This can be in the form of a percentage or flat fee taken from the utility shared by the buyer and seller to each transaction. This operates in a manner similar to commissions charged in markets such as stock markets.

The mathematical models described above are used by the matcher 36 to select an optimal pairing for the participants in the marketplace, and to then determine the proper transaction price to be used between them. By enforcing the described constraints, a stable solution is reached that ensures that no participant could do better by transacting with a different participant. The overall utility of the system is utilized while maximizing the utility of the individual participants.

The result is the fairest possible marketplace, given the constraints on the system. Each buyer selects a reserve that is bet for that participant, as does each seller. The reserves are kept private, and used only by the automated marketplace itself. Without having to undergo a complicated and expensive iteration process, each participant obtains the best possible outcome for that given set of buyers and sellers.

While the invention has been particularly shown and described with reference to a preferred embodiment, it will be understood by those skilled in the art that various changes in form and detail may be made therein without departing from the spirit and scope of the invention.

What is claimed is:

1. A method for optimizing prices at which products are sold in an automated marketplace, comprising:
   generating a matrix of all possible buyers and sellers for a product;
   for each buyer, providing a buyer's reserve price corresponding to a maximum purchase price for each possible seller;
   for each seller, providing a seller's reserve price corresponding to a minimum sales price for each possible buyer;
   calculating a utility value for each pairing of buyers and sellers, wherein the utility value is a linear utility value corresponding to the difference between each buyer's reserve price and each seller's reserve price;
   selecting a unique pairing of buyers and sellers that maximizes total utility;
   calculating a buyer optimal allocation of the total utility for all buyers and sellers in a stable manner;
   calculating a seller optimal allocation of the total utility for all buyers and sellers in a stable manner; and
   for each pair in the unique pairing, selecting a transaction price that allocates the utility between that seller and that buyer.

2. The method of claim 1, wherein providing the buyers reserve price for each buyer comprises:
   for each buyer, providing the buyers reserve price corresponding to a maximum purchase price for each possible seller, wherein at least one buyer limits the sellers to which the buyer agrees to be matched to a subset less than all possible.

3. The method of claim 2, wherein each buyer sets the buyer's reserve price for each possible seller with whom that buyer agrees to be matched, and wherein the buyer's reserve price can be different for each such seller.

4. The method of claim 1, wherein providing the seller's reserve price for each seller comprises:
   for each buyer, providing the seller's reserve price corresponding to a minimum sales price for each possible buyer, wherein at least one seller limits the buyers to which the seller agrees to be matched to a subset less than all possible sellers.

5. The method of claim 4, wherein each seller sets a particular seller's reserve price for each possible buyer with whom that seller agrees to be matched, and wherein the particular seller's reserve price can be different for each such buyer.

6. The method of claim 1, wherein the utility value calculated for each pairing of a buyer and a seller is a difference between that buyers reserve price and that sellers reserve price.

7. The method of claim 1, wherein the step of selecting a transaction price comprises the steps of:
   providing a proportion value between 0 and 1; and
   selecting a transaction price which is proportional to a difference between the optimized seller utility and the optimized buyer utility equal to the proportion value.

8. The method of claim 7, wherein the proportion value equals 0.5.

9. The method of claim 7, wherein the proportion value is less than 0.5.

10. The method of claim 7, wherein the proportion value is greater than 0.5.

11. The method of claim 1, further comprising conducting product transactions at the selected transaction prices.

12. The method of claim 1, wherein the buyers and sellers provide their respective reserve prices by communicating them to a central marketplace server.

13. A system for matching buyers and sellers in an automated marketplace, comprising:
   a plurality of buyers for a product;
   a plurality of sellers for the product;
   a central system containing a matrix of all possible buyers and sellers for the product;
   means for each buyer to select a buyer's reserve price representing a maximum purchase price, wherein the buyer's reserve price is selected for each possible seller of the product;
   means for each seller to select a seller's reserve price representing a minimum selling price, wherein the seller's reserve price is selected for each possible buyer of the product;
   an optimizer within the central system for assigning a utility value, wherein the utility value is a linear utility value corresponding to the difference between each buyer's reserve price and each seller's reserve price, to pairings between buyers and sellers, and calculating a set of such pairings to optimize a global utility value; and means within the central system for assigning buyers and sellers according to the calculated optimized set of pairings, and assigning a stable transaction price for each pairing between the buyer's and seller's reserves for that pairing.

14. The system of claim 13, wherein each buyer sets a different buyer's reserve price for each possible seller.

15. The system of claim 13, wherein each seller sets a different seller's reserve price for each buyer.

16. The system of claim 13, wherein the assigned utility value for each pairing is equal to a difference in the buyer's reserve and the seller's reserve for that pairing.

* * * * *